(12) United States Patent
Hara et al.

(10) Patent No.: US 10,968,926 B2
(45) Date of Patent: Apr. 6, 2021

(54) FLUID PRESSURE DEVICE AND METHOD FOR MANUFACTURING SAME

(71) Applicant: SMC CORPORATION, Chiyoda-ku (JP)

(72) Inventors: Koji Hara, Tsukubamira (JP); Yusuke Saito, Funabashi (JP); Koichiro Ishibashi, Tsukubamira (JP)

(73) Assignee: SMC CORPORATION, Chiyoda-ku (JP)

(*) Notice: Subject to any disclaimer, the term of this patent is extended or adjusted under 35 U.S.C. 154(b) by 60 days.

(21) Appl. No.: 15/767,055

(22) PCT Filed: Jul. 22, 2016

(86) PCT No.: PCT/JP2016/071638
§ 371 (c)(1),
(2) Date: Apr. 9, 2018

(87) PCT Pub. No.: WO2017/064898
PCT Pub. Date: Apr. 20, 2017

(65) Prior Publication Data
US 2019/0063471 A1 Feb. 28, 2019

(30) Foreign Application Priority Data
Oct. 14, 2015 (JP) .............................. JP2015-202708

(51) Int. Cl.
*F15B 15/14* (2006.01)
*B21K 25/00* (2006.01)
(Continued)

(52) U.S. Cl.
CPC .......... *F15B 15/1438* (2013.01); *B21D 39/00* (2013.01); *B21K 25/00* (2013.01);
(Continued)

(58) Field of Classification Search
CPC .............. F15B 15/1438; F15B 15/1433; F15B 15/1428; B21K 25/00
(Continued)

(56) References Cited

U.S. PATENT DOCUMENTS 3,605,915 A * 9/1971 Gately .................... B03C 3/766
173/200
3,811,367 A * 5/1974 Bimba ................ F15B 15/1438
92/165 R
(Continued)

FOREIGN PATENT DOCUMENTS

DE 11 2012 002 197 T5 2/2014
JP 62-46007 A 2/1987
(Continued)

OTHER PUBLICATIONS

International Search Report dated Oct. 18, 2016, in PCT/JP2016/071638 filed Jul. 22, 2016.
(Continued)

*Primary Examiner* — Dustin T Nguyen
(74) *Attorney, Agent, or Firm* — Oblon, McClelland, Maier & Neustadt, L.L.P.

(57) ABSTRACT

A fluid pressure cylinder. A first stepped section having a greater diameter than a cylinder chamber is formed at one end of a cylinder tube constituting a fluid pressure cylinder. A disc-shaped head cover is inserted into the cylinder chamber. The one end is pressed and plastically deformed by a staking jig to form a deformed section, and the head cover is affixed within the first stepped section by the deformed section. As a result of this configuration, the head cover can be more firmly affixed while the sealing effect between the cylinder tube and the head cover is ensured. This eliminates (Continued)

need for a seal means and an engagement means which is used to affix the head cover, and consequently, the number of parts can be reduced.

2 Claims, 7 Drawing Sheets

(51) Int. Cl.
*F16K 27/04* (2006.01)
*B21D 39/00* (2006.01)
*F15B 15/22* (2006.01)

(52) U.S. Cl.
CPC ...... *F15B 15/1428* (2013.01); *F15B 15/1433* (2013.01); *F16K 27/041* (2013.01); *F15B 15/226* (2013.01)

(58) Field of Classification Search
USPC .................................. 92/169.1, 128; 29/520
See application file for complete search history.

(56) References Cited

U.S. PATENT DOCUMENTS

| | | | | |
|---|---|---|---|---|
| 4,002,107 A * | 1/1977 | Erickson | ............. | F15B 15/1438 92/163 |
| 5,333,836 A * | 8/1994 | Fukuyo | ................. | B60T 8/3675 251/129.15 |
| 6,508,520 B2 * | 1/2003 | Sampson | ............... | B60T 8/3675 138/89 |
| 6,851,659 B2 * | 2/2005 | Zutt | ....................... | B23P 11/005 137/15.17 |
| 7,614,133 B2 * | 11/2009 | Candelieri | ............. | B21D 39/04 29/508 |
| 8,991,435 B2 * | 3/2015 | Schulz | .................... | F16L 55/11 138/89 |
| 2010/0212491 A1 | 8/2010 | Nishi | | |
| 2013/0032027 A1 * | 2/2013 | Orihara | ................... | F15B 15/20 91/418 |
| 2014/0366716 A1 * | 12/2014 | Horikawa | ................ | F16J 10/02 92/28 |
| 2017/0284428 A1 * | 10/2017 | Okuhira | ..................... | F16J 7/00 |

FOREIGN PATENT DOCUMENTS

| | | | | |
|---|---|---|---|---|
| JP | 2005-240936 A | 9/2005 | | |
| JP | 2005240936 | * | 9/2005 | ............. F15B 15/14 |
| JP | 5212773 B2 | 6/2013 | | |
| KR | 10-2014-0074845 | 2/2014 | | |

OTHER PUBLICATIONS

Office Action dated Sep. 7, 2020 in India Patent Application No. 201847017052 (with English-language translation); 6 pgs.

* cited by examiner

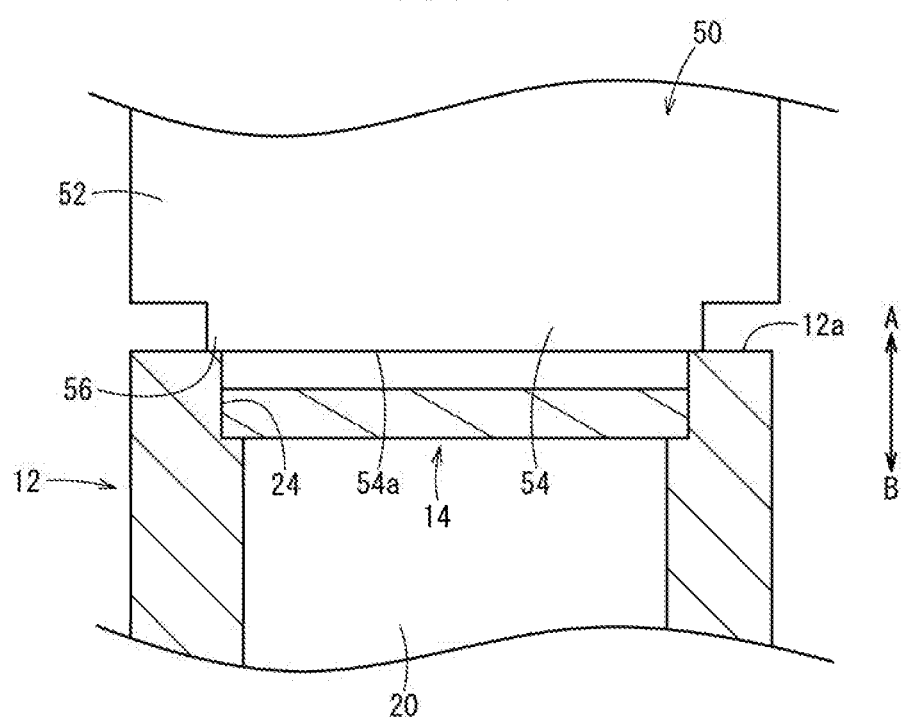

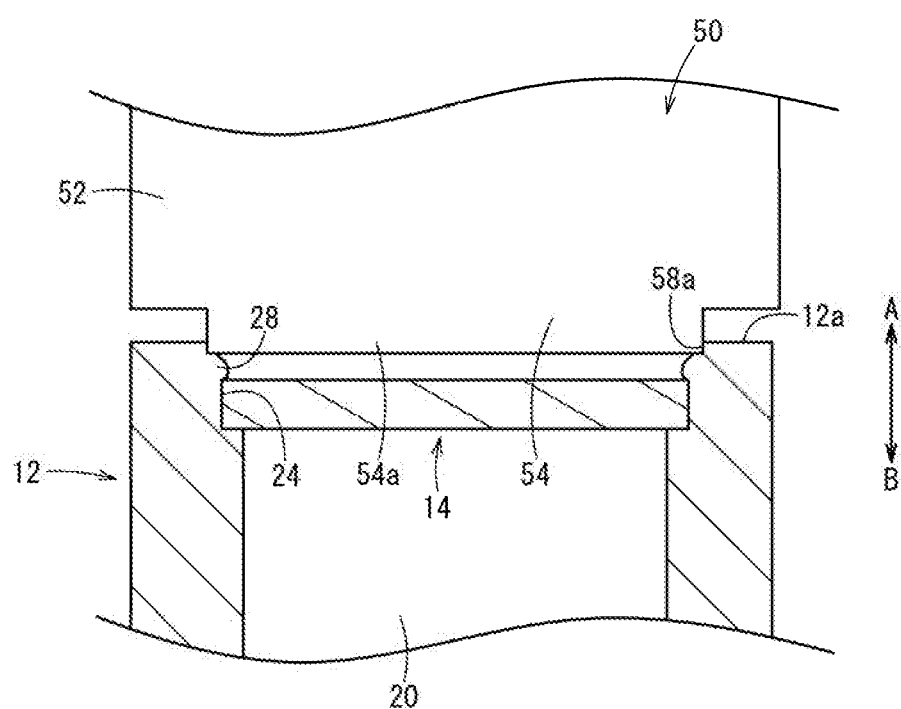

FLUID PRESSURE DEVICE AND METHOD FOR MANUFACTURING SAME

TECHNICAL FIELD

The present invention relates to a fluid pressure device that displaces a piston in an axial direction by the action of supply of a pressure fluid and a method for producing the fluid pressure device.

BACKGROUND ART

The applicant of the present application has proposed, as a conveying means for a workpiece or the like, a fluid pressure cylinder, which functions as a fluid pressure device, disclosed in Japanese Patent No. 5212773, for example. The fluid pressure cylinder includes, for instance, a tubular cylinder tube, a set of cylinder covers which are provided at the ends of the cylinder tube, and a piston which is provided inside the cylinder tube in a displaceable manner, and, by supplying pressure fluid to ports of the cylinder covers, presses the piston by the pressure fluid introduced into the cylinder tube and displaces the piston in an axial direction.

SUMMARY OF INVENTION

The above-described fluid pressure cylinder adopts a configuration in which, when the cylinder cover is attached to an end of the cylinder tube, by engaging a locking ring in a groove portion formed in the inner circumferential surface of the cylinder tube after the cylinder cover is inserted into the cylinder tube, the cylinder cover is fixed by the locking ring. By providing a sealing member in an annular groove formed in the outer circumferential surface of the cylinder cover, the cylinder cover and the cylinder tube are kept airtight.

In recent years, a reduction in the number of parts has been required for reducing production costs and the number of person-hours needed for assembly.

A general object of the present invention is to provide a fluid pressure device that can ensure sealing performance while reliably fixing a covering member to a body with a simpler configuration and a method for producing such a fluid pressure device.

The present invention is directed to a fluid pressure device including: a tubular body having a piston chamber inside; a covering member that is attached to an end of the body; and a piston that is provided in a displaceable manner along the piston chamber, wherein the covering member is inserted into the piston chamber open at the end of the body, and regulated and fixed in an axial direction by a deformed portion formed by deforming the end.

According to the present invention, the covering member is inserted into the piston chamber open at the end of the body constituting the fluid pressure device, and is regulated in the axial direction by the deformed portion formed by deforming the end of the body.

Thus, when the covering member is attached to the end of the body, since there is no need to provide a locking means for regulating the movement of the covering member in the axial direction and there is also no need to provide a sealing means between the covering member and the body, it is possible to reduce the number of parts compared to the conventional fluid pressure device.

As a result, it is possible to fix the covering member reliably to the end of the body while achieving simplification of a configuration compared to the conventional fluid pressure device and ensure sealing performance by keeping the piston chamber airtight by the covering member.

The above-described object, features, and advantages will be easily understood from the following description of embodiments given below with reference to the attached drawings.

BRIEF DESCRIPTION OF DRAWINGS

FIG. 4 is an enlarged sectional view showing a state in which the head cover is inserted into the cylinder tube of the fluid pressure cylinder of FIG. 3 and a caulking jig is brought into contact with the cylinder tube;

FIG. 5 is an enlarged sectional view showing a state in which deformation of the cylinder tube of FIG. 4 is started by the caulking jig;

DESCRIPTION OF EMBODIMENTS

Figure 1:
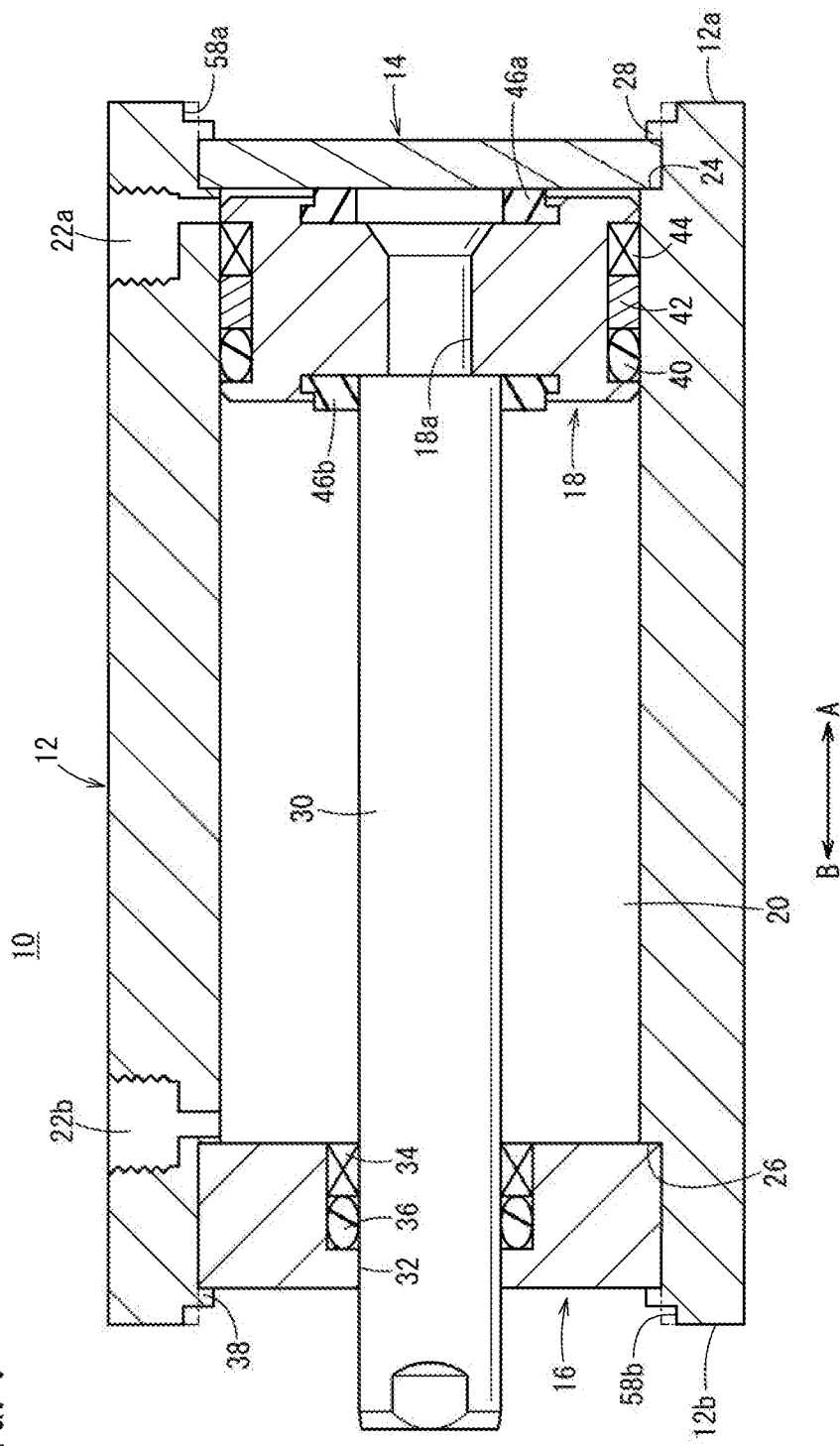
FIG. 1 is an overall sectional view of a fluid pressure cylinder according to a first embodiment of the present invention.

As depicted in FIG. 1, the fluid pressure cylinder 10 includes a cylinder tube (body) 12, a head cover (a covering member) 14 that is attached to the cylinder tube 12 at one end 12a side (an arrow A direction), a rod cover (a covering member) 16 that is attached to the cylinder tube 12 at the other end 12b side (an arrow B direction), and a piston 18 that is provided inside the cylinder tube 12 in a displaceable manner.

The cylinder tube 12 is formed as a cylindrical body which extends in an axial direction (arrows A, B directions) with a substantially constant diameter, and a cylinder chamber (a piston chamber) 20 in which the piston 18 is housed is formed inside the cylinder tube 12.

In the outer circumferential surface of the cylinder tube 12, a set of ports 22a, 22b is formed near the ends of the cylinder tube 12, and communicates with the interior of the cylinder tube 12. In addition, a pressure fluid is supplied to and discharged from the ports 22a, 22b through piping connected to an unillustrated pressure fluid supply source.

Meanwhile, at the one end 12a and the other end 12b of the cylinder tube 12, a first step portion (a step portion) 24 and a second step portion (a step portion) 26 both have an inner circumferential surface displaced in a radial outward direction with respect to the cylinder chamber 20. The first step portion 24 is formed at a location a predetermined length away from the one end 12a of the cylinder tube 12 toward the other end 12b (the arrow B direction), and the head cover 14 is attached thereto. The second step portion 26 is formed at a location a predetermined length away from the other end 12b of the cylinder tube 12 toward the one end 12a (the arrow A direction), and the rod cover 16 is attached thereto.

The head cover 14 is formed of a metal material, for example, into a disk shape, and inserted into the first step portion 24 of the cylinder tube 12. The inner diameter of the first step portion 24 is formed so as to be substantially equal to the diameter of the head cover 14.

By pressing the one end 12a of the cylinder tube 12 in the axial direction (the arrow B direction) by a caulking jig (a jig) 50 and plastically deforming the one end 12a so as to bulge in a radial inward direction, the inner diameter of the first step portion 24 is reduced and the outer edge of the head cover 14 is covered with the deformed part of the cylinder tube 12, that is, a deformed portion 28. As a result, the head cover 14 is sandwiched and held between the plastically deformed one end 12a of the cylinder tube 12 and the first step portion 24.

At the one end 12a of the cylinder tube 12, a machined hole 58a which is circular in cross section diametrically enlarged by a machining portion 54 of the caulking jig 50 is formed, and the machined hole 58a functions as, for example, a coupling hole (a positioning hole) that is used, for instance, when fixing the fluid pressure cylinder 10.

Thus, the one end 12a of the cylinder tube 12 is closed with the head cover 14, and the cylinder chamber 20 is sealed at the one end (the arrow A direction).

The rod cover 16 is formed, for example, of a metal material, in a cylinder shape having a predetermined length in the axial direction, and a rod hole 32 through which a piston rod 30 is placed is formed in a central part of the rod cover 16 and a bush 34 and rod packing 36 are attached to the inner circumferential surface of the rod hole 32. The rod cover 16 is inserted into the second step portion 26 from the other end 12b side of the cylinder tube 12. The inner diameter of the second step portion 26 is formed so as to be substantially equal to the diameter of the rod cover 16.

Then, the other end 12b of the cylinder tube 12 is pressed by the caulking jig 50 in the axial direction (the arrow A direction) and plastically deformed so as to bulge in the radial inward direction. The reduces the inner circumferential surface of the second step portion 26, and the outer edge of the rod cover 16 is covered with the deformed part of the cylinder tube 12, that is, a deformed portion 38. As a result, the rod cover 16 is sandwiched and held between the plastically deformed other end 12b of the cylinder tube 12 and the second step portion 26.

At the other end 12b of the cylinder tube 12, as is the case with the one end 12a of the cylinder tube 12, a machined hole 58b which is circular in cross section diametrically enlarged by the machining portion 54 of the caulking jig 50 is formed, and the machined hole 58b may be used as, for example, a coupling hole (a positioning hole) that is used, for instance, when fixing of the fluid pressure cylinder 10.

The piston 18 is formed to have a circular cross section, for example, and, to the outer circumferential surface thereof, piston packing 40, a magnetic body 42, and a wear ring 44 are attached via an annular groove. In addition, in a central part of the piston 18, a piston hole 18a extending through the piston 18 in the axial direction (the arrows A, B directions) is formed, and one end of the piston rod 30 is inserted through the piston hole 18a and coupled thereto. Then, the other end of the piston rod 30 is placed through the rod hole 32 of the rod cover 16 and supported by the bush 34 in a displaceable manner.

Further, to one end face and the other end face of the piston 18, dampers 46a and 46b are respectively attached so as to slightly protrude from the piston 18 in the axial direction (the arrows A, B directions), and, by the action of displacement of the piston 18, the one damper 46a makes contact with the head cover 14 and the other damper 46b makes contact with the rod cover 16. Since these dampers 46a and 46b are formed of an elastic material such as rubber, the dampers 46a and 46b prevent the piston 18 from making direct contact with the head cover 14 and the rod cover 16 and absorb an impact and generation of impact sound at the displacement terminal positions.

The fluid pressure cylinder 10 according to the first embodiment of the present invention is basically configured as described above. Next, a method for producing the fluid pressure cylinder 10 will be described. Here, a case in which the head cover 14 is attached to the one end 12a of the cylinder tube 12 will be described.

First, the caulking jig 50 which is used for attachment of the head cover 14 will be described. As depicted in FIGS. 4 and 5, the caulking jig 50 includes, for example, a main body portion 52 that is formed in the shape of a shaft having a predetermined diameter and held by a pressure device (not depicted in the drawing) which moves in the axial direction (the arrows A, B directions) and the machining portion 54 that protrudes from the tip of the main body portion 52. The machining portion 54 is formed so as to have a smaller diameter than the main body portion 52 and protrude therefrom by a predetermined length, and has, at an end thereof, a flat machining face 54a which is substantially perpendicular to the axis of the caulking jig 50. The machining portion 54 and the main body portion 52 are coaxially formed.

As depicted in FIG. 4, the diameter of the machining portion 54 is larger than the diameter of the first step portion 24 at the one end 12a of the cylinder tube 12 on which a caulking process is to be performed. Therefore, a part of the machining portion 54, which is positioned radially outside the inner circumferential surface of the first step portion 24, can make contact with the one end 12a of the cylinder tube 12. In other words, the machining portion 54 is formed to have such a diameter that a part of the machining portion 54 on the inner peripheral side of the first step portion 24 makes contact with the one end 12a of the cylinder tube 12.

Figure 3:
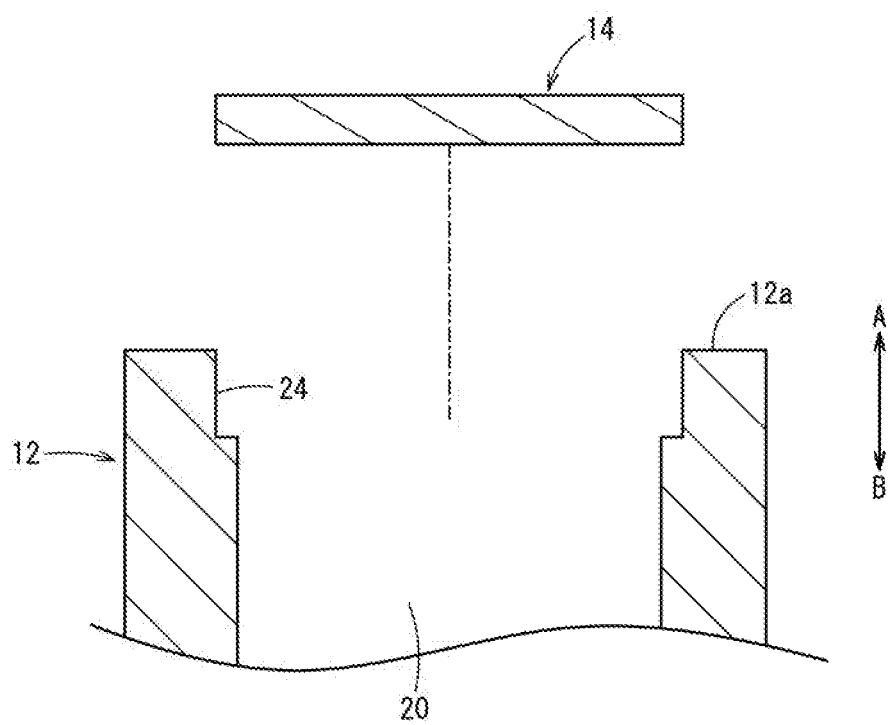
FIG. 3 is an enlarged sectional view showing a state before the head cover is inserted into a first step portion of a cylinder tube in a process of producing the fluid pressure cylinder of FIG. 1.

Next, when caulking the head cover 14 onto the one end 12a of the cylinder tube 12 by using the above-described caulking jig 50, first, as depicted in FIG. 3, the cylinder tube 12 is fixed so that the one end 12a thereof faces upward (the arrow A direction), for example, and the disk-shaped head cover 14 is inserted thereinto from above and placed on the first step portion 24 (see FIG. 4). As a result, the head cover 14 extends horizontally inside the cylinder tube 12 so as to be substantially perpendicular to the axis of the cylinder tube 12.

Next, as depicted in FIG. 4, the cylinder tube 12 is positioned so as to be located below the caulking jig 50 set on the unillustrated pressure device and the caulking jig 50 and the cylinder tube 12 are coaxially placed.

Then, the caulking jig 50 is moved downward by the driving action of the unillustrated pressure device to bring the machining face 54a of the machining portion 54 of the caulking jig 50 into abutment against the one end 12a of the cylinder tube 12, and then, as depicted in FIG. 5, is moved further downward, whereby the inner peripheral side of the one end 12a is pressed toward the head cover 14 (the arrow B direction) by the outer edge 56 of the machining face 54a.

Figure 2:
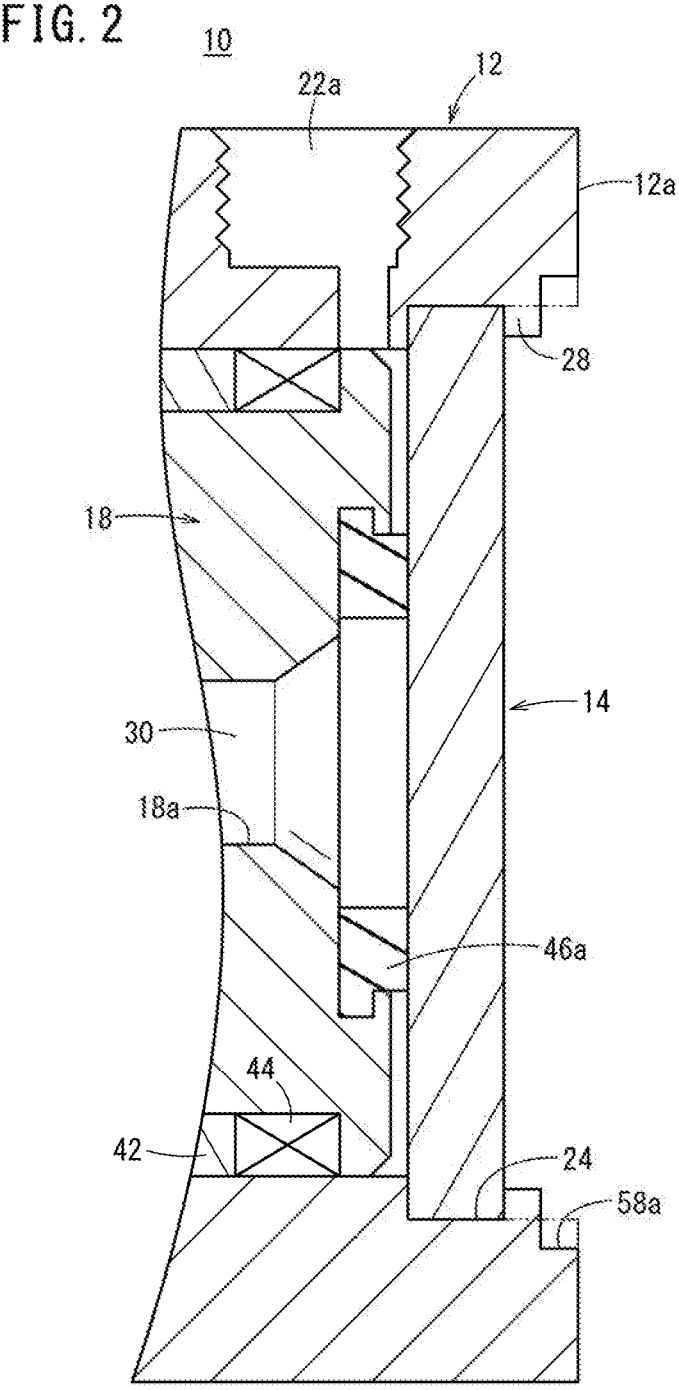
FIG. 2 is an enlarged sectional view showing an area near a head cover in the fluid pressure cylinder of FIG. 1.

As depicted in FIG. 5, the one end 12a of the cylinder tube 12 is sheared inward and plastically deformed at the inner circumferential side facing the first step portion 24, and shaped as the deformed portion 28 bulging toward the inner peripheral side of the first step portion 24. Then, the deformed portion 28 covers an area near the outer edge of the head cover 14 in the first step portion 24 as depicted in FIG. 2, the head cover 14 is sandwiched between the first step portion 24 and the deformed portion 28, which has been plastically deformed, of the cylinder tube 12, and thereby firmly fixed, while keeping the head cover 14 and the cylinder tube 12 airtight.

As a result, the head cover 14 is attached and fixed to the one end 12*a* of the cylinder tube 12.

At the one end 12*a* of the cylinder tube 12, the machined hole 58*a* sheared by the above-described caulking jig 50 is formed, and thus the machined hole 58*a* is formed so as to have substantially the same diameter as the outer peripheral diameter of the machining portion 54, a circular cross section, and a predetermined depth. The machined hole 58 is formed so as to have a diameter larger than the inner diameter of the cylinder chamber 20.

Since the rod cover 16 is attached to the second step portion 26 at the other end 12*b* of the cylinder tube 12 in basically the same manner as the above-described case of the head cover 14, the detailed description of the attachment method therefor is omitted.

Next, an operation of the fluid pressure cylinder 10 produced in the manner described above will be briefly described with reference to FIG. 1. The following description is given on the assumption that a state, in which the piston 18 is displaced to the head cover 14 side (the arrow A direction) as shown in FIG. 1, is an initial position.

First, from an unillustrated pressure fluid supply source, a pressure fluid is introduced into the port 22*a* arranged on the head cover 14 side. In the case, the port 22*b* arranged on the rod cover 16 side is kept in a state in which the port 22*b* is opened to the atmosphere by the switching action of an unillustrated switching valve. As a result, the pressure fluid is supplied to the cylinder chamber 20 from the port 22*a*, and the piston 18 is pressed to the rod cover 16 side (the arrow B direction) by the pressure fluid introduced into the cylinder chamber 20. Then, the piston rod 30 is integrally displaced as the piston 18 is displaced and positioned at the displacement terminal position by the abutment of the damper 46*b* against the rod cover 16.

On the other hand, to displace the piston 18 in a direction (the arrow A direction) opposite to the above-described direction, the pressure fluid is supplied to the port 22*b* on the rod cover 16 side and the port 22*a* on the head cover 14 side is opened to the atmosphere by the action of switching of a switching valve (not depicted in the drawing). Then, the pressure fluid introduced into the cylinder chamber 20 from the port 22*b* presses the piston 18 toward the head cover 14 (the arrow A direction).

The piston 18 is displaced along the cylinder chamber 20 with the piston rod 30 and returns to the initial position by the abutment of the damper 46*a* against the head cover 14 (see FIG. 1).

As described above, in the first embodiment, the first and second step portions 24, 26 having diameters larger than that of the cylinder chamber 20 are provided at both ends (12*a*, 12*b*) of the cylinder tube 12 constituting the fluid pressure cylinder 10 and, in a state in which the head cover 14 is inserted into the first step portion 24 and the rod cover 16 is inserted into the second step portion 26, the ends of the cylinder tube 12 are pressurized in the axial direction by the caulking jig 50 and thereby plastically deformed. As a result, it is possible to fix the head cover 14 and the rod cover 16 firmly to the cylinder tube 12 by the deformed portions 28, 38 bulging in the radial inward direction by the plastic deformation. This eliminates the need for a locking ring and a groove portion to engage the locking ring therein, which are used in the conventional fluid pressure cylinder, and makes it possible to simplify the configuration by reducing the number of parts and also makes it possible to reduce the number of man-hours needed for assembly.

Since the head cover 14 is sandwiched between the deformed portion 28 and the first step portion 24, sealing of the cylinder chamber 20 is achieved via the head cover 14. In addition, since the rod cover 16 is sandwiched between the deformed portion 38 and the second step portion 26, sealing of the cylinder chamber 20 is achieved via the rod cover 16. This eliminates the need for an extra sealing member and an extra annular groove for attachment of the sealing member and makes it possible to achieve a reduction in the number of parts and the number of man-hours needed for machining and improve production efficiency.

The above-described fluid pressure cylinder 10 adopts a configuration in which the head cover 14 is placed on the first step portion 24 formed at the one end 12*a* of the cylinder tube 12, and the rod cover 16 is placed on the second step portion 26 formed at the other end 12*b*, and both are fixed thereto by caulking using by the caulking jig 50, but the configuration is not limited thereto. For example, a configuration may be adopted in which the first step portion 24 and the second step portion 26 are not provided and the head cover 14 and the rod cover 16 are press-fitted into the cylinder tube 12, and subjected to a caulking process by the caulking jug 50.

In the case, since the head cover 14 and the rod cover 16 are press-fit into the cylinder tube 12, the head cover 14 and the rod cover 16 do not move in the axial direction (the arrows A, B directions) and the movement thereof in the axial outward directions is regulated by the deformed portions 28, 38 which has been plastically deformed. As a result, even when the pressure of the cylinder chamber 20 is applied to the head cover 14 and the rod cover 16, the head cover 14 and the rod cover 16 are prevented from being detached from the cylinder tube 12.

That is, since there is no need to provide the first and second step portions 24, 26 in the cylinder tube 12, it is possible to reduce machining costs and thereby achieve a reduction in production costs.

Further, when the head cover 14 and the rod cover 16 are caulked into the cylinder tube 12, the machined holes 58*a* and 58*b*, each having a circular cross section, are respectively formed by the machining portion 54 of the caulking jig 50, and the machined holes 58*a* and 58*b* can be used, for example, as coupling holes when the fluid pressure cylinder 10 is fixed to another device, a placement surface, or the like. Thus, the use of the machined holes 58*a* and 58*b* eliminates the need for an extra hole provided for positioning or the like of the fluid pressure cylinder 10 and a machining process therefor, which makes it possible to achieve reduction in production time and costs.

Figure 6A:
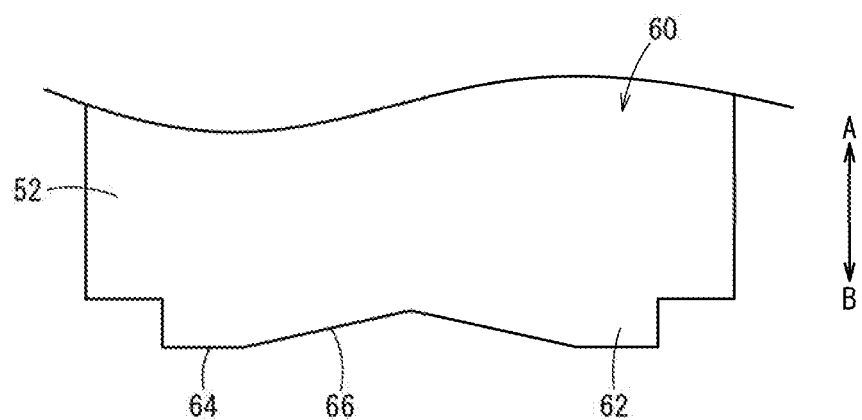
FIG. 6A is an enlarged sectional view showing an area near the tip of a caulking jig according to a first modified example.
Figure 6B:
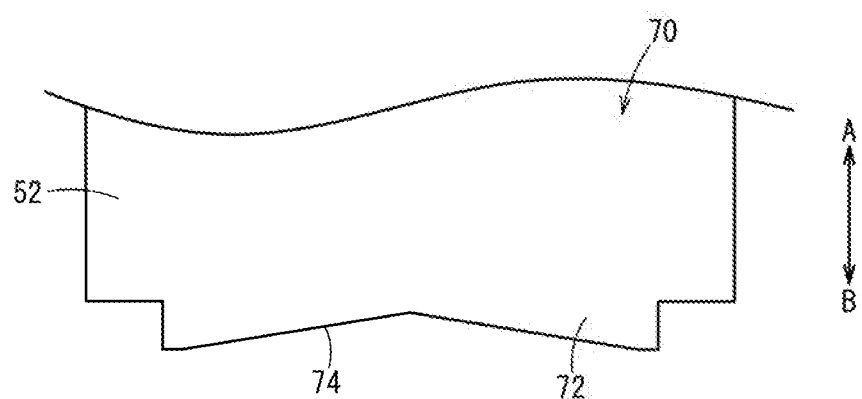
FIG. 6B is an enlarged sectional view showing an area near the tip of a caulking jig according to a second modified example.

The caulking jig 50 is not limited to the above-described caulking jig having the machining portion 54 with a flat end face. For example, like a caulking jig 60 depicted in FIG. 6A, a caulking jig may have a flat face 64 only at the outer edge of a machining portion 62 and a tapered face 66 which is gradually inclined upward (the arrow A direction) inside the flat face 64. Further, like a caulking jig 70 depicted in FIG. 6B, a caulking jig may have a machining portion 72 whose lower surface is configured only with a tapered face 74 which is gradually inclined upward (the arrow A direction) from the outer edge toward the center.

By providing the tapered faces 66, 74 as described above, when the ends of the cylinder tube 12 are deformed by being pressurized in the axial direction by the caulking jigs 60, 70, it is possible to make portions, which are deformed and flowed, suitably slide in the radial inward direction along the tapered faces 66, 74. This makes it possible to form, reliably and stably, the deformed portions 28, 38 that respectively bulge toward the inner circumferential surfaces of the first step portion 24 and the second step portion 26.

By providing the flat face 64 at the outer edge of the machining portion 62 in the caulking jig 60, when the caulking jig 60 is brought into contact with the one end 12*a* and the other end 12*b* of the cylinder tube 12, since the contact can be made between surfaces, it is possible to perform a caulking operation reliably and stably.

Figure 7:
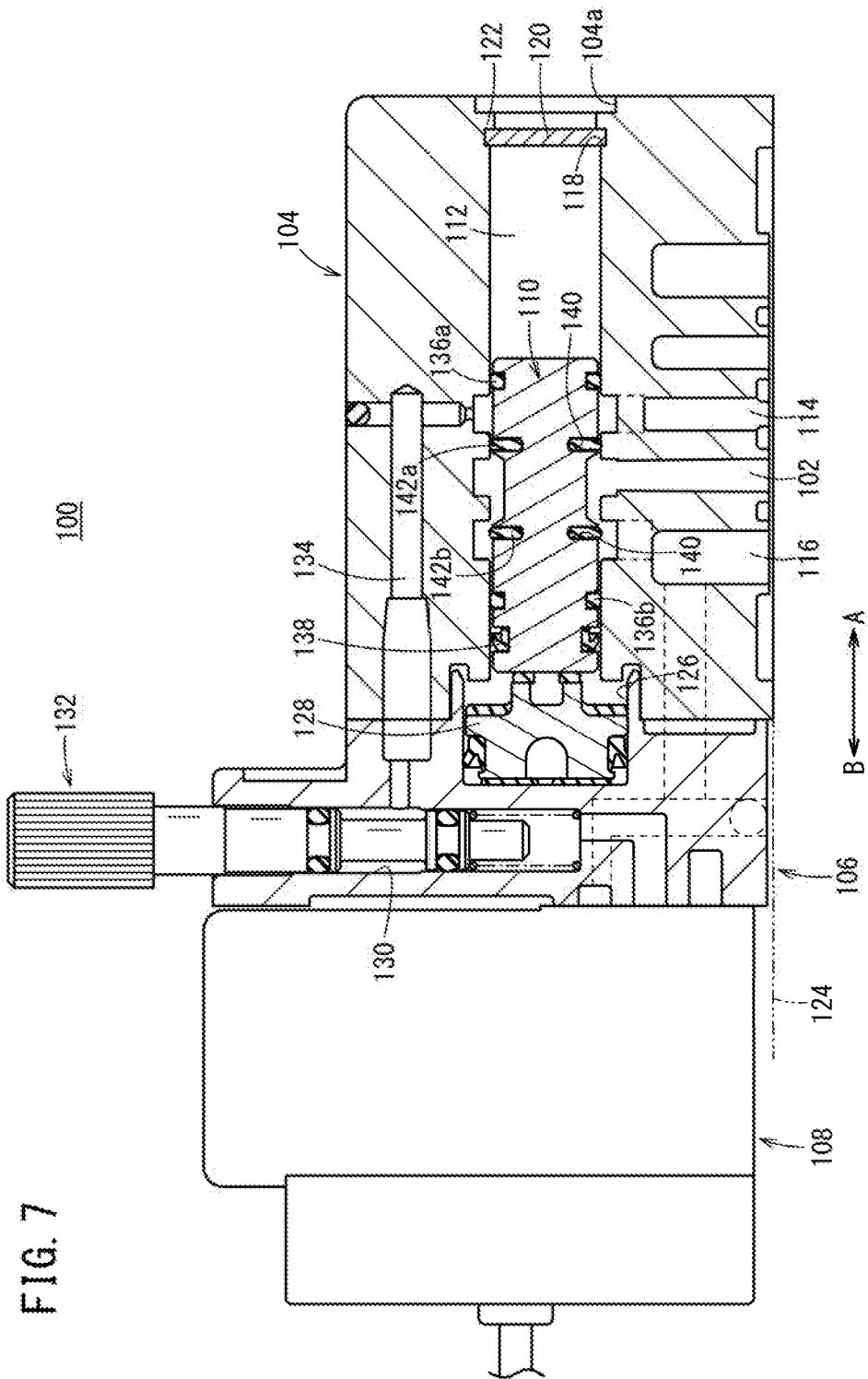
FIG. 7 is an overall sectional view of a flow rate control device according to a second embodiment of the present invention.

Next, a flow rate control device 100, which is used as a fluid pressure device, according to a second embodiment is depicted in FIG. 7. The flow rate control device 100 is a normally closed (NC) three port solenoid valve in which flow of a pressure fluid is cut off in normal times.

As depicted in FIG. 7, the flow rate control device 100 includes a body 104 provided with, for example, a connection port 102 through which the pressure fluid is supplied and discharged, a base member 106 that is coupled to an end of the body 104, a pilot valve 108 that is connected to the base member 106 and switches the flow state of the pressure fluid by the action of energization, and a spool valve 110 that switches the flow state of the circulating pressure fluid by the action of switching of the pilot valve 108.

The body 104 is formed so as to be rectangular in cross section and elongated in a horizontal direction, for example, and, substantially in the central part thereof, a spool hole (a piston chamber) 112 passing through the body 104 in the axial direction (the arrows A, B directions) is formed and the spool valve 110 is movably provided therein. In a lower end face perpendicular to the axial direction of the body 104, an air supply port 114, the connection port 102 connected to another fluid pressure device, and an exhaust port 116 are formed side by side. The air supply port 114, the connection port 102, and the exhaust port 116 communicate with the spool hole 112.

At one end of the spool hole 112, a step portion 118 with an increased diameter is formed, and, in a state in which a disk-shaped head cover (covering member) 120 is placed in and abutted against the step portion 118, the head cover 120 is fixed to the one end of the spool hole 112 by the deformed portion 122 formed by plastically deforming the periphery of the step portion 118 by an unillustrated caulking jig and bulging it radially inward. This allows the one end of the spool hole 112 to be reliably closed and, in addition thereto, eliminates the need for an O-ring or the like for sealing.

At the one end of the spool hole 112, a machined hole 104*a*, which is circular in cross section, is formed by a caulking jig (not depicted in the drawing) in caulking the head cover 120. The machined hole 104*a* can be used as a coupling hole when, for example, the flow rate control device 100 is fixed to another device or the like.

Further, the lower end face of the body 104 is connected to a manifold 124 or the like and connected, via the manifold 124, to unillustrated piping or fluid pressure device.

The base member 106 is connected in such a way as to cover the other end of the body 104, and in a piston hole 126 formed in a position facing the spool hole 112, a piston 128 is provided in a displaceable manner, and an operating shaft 132 is made to threadedly and rotatably engaged with a shaft hole 130 extending in a vertical direction.

Since the shaft hole 130 communicates with the air supply port 114 through a communicating path 134 formed in the body 104, the pressure fluid supplied to the air supply port 114 is introduced into the shaft hole 130.

The pilot valve 108 is connected to an end of the base member 106 on the side (the arrow B direction) opposite to the body 104, and switches the state of supply of the pressure fluid to the piston hole 126 based on a control signal from an unillustrated control device. That is, to the piston hole 126, the pressure fluid is supplied by the action of switching of the pilot valve 108, and the piston 128 is biased toward the spool valve 110 (the arrow A direction).

The spool valve 110 is formed as a shaft body having a predetermined length in the axial direction (the arrows A, B directions). A set of O-rings 136*a* and 136*b* is attached to the outer circumferential surface near one end and the other end thereof, and a valve packing 138 is attached to the other end on the base member 106 side, so as to be adjacent to the O-ring 136*b*.

In the outer circumferential surface of the spool valve 110, annular depressions 140 recessed radially inward are formed substantially in the central part in the axial direction (the arrows A, B directions), with annular sealing rings 142*a* and 142*b* respectively provided. That is, in the outer circumferential surface of the spool valve 110, a set of O-rings 136*a* and 136*b*, the sealing rings 142*a* and 142*b*, and the valve packing 138 are provided so as to be separated from one another at predetermined intervals in the axial direction and can make a sliding contact with the inner circumferential surface of the spool hole 112.

Next, an operation of the above-described flow rate control device 100 will be briefly described.

First, in normal state in which a control signal is not being input to the pilot valve 108, the pressure fluid, which is supplied to the air supply port 114, is supplied to the spool hole 112, so that the spool valve 110 moves toward the base member 106 (the arrow B direction) and the connection port 102 and the exhaust port 116 communicate with each other accordingly as depicted in FIG. 7.

Next, in response to a control signal being input to the pilot valve 108 from the unillustrated control device, the pressure fluid is supplied to the piston hole 126, so that the piston 128 is pressed toward the body 104 (the arrow A direction) and presses the spool valve 110 to move toward the head cover 120. As a result, the connection port 102 and the air supply port 114 communicate with each other and communication between the connection port 102 and the exhaust port 116 is interrupted. Then, the pressure fluid supplied to the air supply port 114 is supplied to the unillustrated fluid pressure device from the connection port 102 through the spool hole 112.

As described above, in the second embodiment, the disk-shaped head cover 120 is inserted into the spool hole 112 of the body 104 constituting the flow rate control device 100 and fixed by caulking the periphery to be deformed radially inward. As a result, it is possible to block and seal the spool hole 112 at the same time. In other words, the can eliminate the need for a cap and an O-ring which are used in the conventional flow rate control device.

As a result, in the flow rate control device 100, it is possible to achieve a reduction in the number of parts and the number of person-hours needed for assembly.

Since the spool hole 112 can be easily closed by the head cover 120, it is possible to form the spool hole 112 as a through hole, not as a bottomed spool hole 112 with one end closed, for example. Accordingly, it is possible to enhance the capability of discharging chippings that are generated at the time of formation of the spool hole 112 by cutting or the like.

It goes without saying that the fluid pressure device and the method for producing the fluid pressure device according to the present invention are not limited to the above-described embodiments and can adopt various configurations within the scope of the present invention.

The invention claimed is:

1. A method for producing a fluid pressure device that includes a tubular body having a piston chamber inside, a covering member that is attached to an end of the body, and a piston that is provided in a displaceable manner along the piston chamber, the method comprising the steps of:
   inserting the covering member into an opening at the end of the tubular body; and
   plastically deforming the end of the tubular body, creating a deformed portion that bulges into the opening in a radially inward direction of the tubular body, by pressing the end of the tubular body in an axial direction of the tubular body with a machining portion provided at an end face of a jig, the end face having a tapered surface extending to a center axis of the jig,
   wherein the tapered surface at the end of the jig is tapered to be recessed away from the covering member in an axial direction of the jig when plastically deforming the end of the tubular body, to increase a distance of the tapered surface away from the covering member as viewed in a direction toward the axis of the jig, and
   wherein the deformed portion is deformed sufficiently that it covers an outer edge of the covering member and thereby provides an airtight seal for the piston chamber.

2. The method according to claim 1, wherein the covering member is attached to the end of the tubular body by press-fitting.

* * * * *